US009807857B2

(12) United States Patent
Huang

(10) Patent No.: US 9,807,857 B2
(45) Date of Patent: Oct. 31, 2017

(54) ILLUMINATION CONTROL SYSTEM

(71) Applicant: INTERNATIONAL MOBILE IOT CORP., Taipei (TW)

(72) Inventor: Jung-Tang Huang, Taipei (TW)

(73) Assignee: INTERNATIONAL MOBILE IOT CORP., Taipei (TW)

(*) Notice: Subject to any disclaimer, the term of this patent is extended or adjusted under 35 U.S.C. 154(b) by 133 days.

(21) Appl. No.: 14/221,304

(22) Filed: Mar. 21, 2014

(65) Prior Publication Data

US 2014/0285113 A1 Sep. 25, 2014

(30) Foreign Application Priority Data

Mar. 22, 2013 (TW) ............................. 102110230 A

(51) Int. Cl.
*G01J 1/20* (2006.01)
*H05B 37/02* (2006.01)

(52) U.S. Cl.
CPC ................................ *H05B 37/0272* (2013.01)

(58) Field of Classification Search
CPC .... H05B 37/0272; H05B 37/02; H05B 41/24; G01J 1/20
USPC .................................................. 315/291–311
See application file for complete search history.

(56) References Cited

U.S. PATENT DOCUMENTS

2010/0201267 A1* 8/2010 Bourquin ........... H05B 37/0245 315/32
2012/0001567 A1* 1/2012 Knapp .................. H04L 12/282 315/291
2012/0068608 A1* 3/2012 Covaro ..................... G01J 1/18 315/151
2013/0026945 A1* 1/2013 Ganick .............. H05B 37/0272 315/246
2013/0249410 A1* 9/2013 Thompson ......... H05B 37/0227 315/158
2013/0271004 A1* 10/2013 Min ................... H05B 33/0842 315/112
2014/0225526 A1* 8/2014 Jonsson ................. H05B 37/02 315/291

(Continued)

FOREIGN PATENT DOCUMENTS

TW 200913779 3/2009
TW 200942852 10/2009

(Continued)

OTHER PUBLICATIONS

"Office Action of Taiwan Counterpart Application", dated Apr. 20, 2015, p. 1-p. 7, in which the listed references were cited.

*Primary Examiner* — Brandon S Cole
(74) *Attorney, Agent, or Firm* — JCIPRNET

(57) ABSTRACT

An illumination control system provides wireless data transmission with a lamp through a mobile communication device. The lamp has a built-in wireless communication module and a microcontroller. The microcontroller stores a location of the lamp with latitude-longitude values and height values. Accordingly, a user may use the mobile communication device to read the latitude-longitude values and height values of the lamps to achieve an indoor positioning function by calculating a positioning information of the user through indoor positioning algorithms, and thereby enable illumination control through the mobile communication device according to the positioning information.

16 Claims, 16 Drawing Sheets

(56) References Cited

U.S. PATENT DOCUMENTS

| | | | | |
|---|---|---|---|---|
| 2014/0372072 | A1* | 12/2014 | Guo | H04B 10/116 702/150 |
| 2014/0375230 | A1* | 12/2014 | Liu | H05B 37/02 315/294 |
| 2015/0015165 | A1* | 1/2015 | Engelen | H04B 10/1143 315/294 |
| 2015/0163886 | A1* | 6/2015 | Park | H05B 37/029 315/297 |

FOREIGN PATENT DOCUMENTS

| | | |
|---|---|---|
| TW | 201108859 | 3/2011 |
| TW | 201212672 | 3/2012 |
| TW | M435129 | 8/2012 |

* cited by examiner

ILLUMINATION CONTROL SYSTEM

CROSS-REFERENCE TO RELATED APPLICATION

This application claims the priority benefit of Taiwan application serial no. 102110230, filed on Mar. 22, 2013. The entirety of the above-mentioned patent application is hereby incorporated by reference herein and made a part of this specification.

BACKGROUND

Field of the Invention

The invention relates to an illumination control system, and more particularly, the invention relates to an illumination control system that senses a status of a user through a sensor and accurately obtains latitude-longitudes and indoor floor heights of the user through a user positioning function, and controls illumination of light sources based on the positioning data.

Description of Related Art

In a society with aging population and declining birthrate, the importance of adopting an intelligent life and home care system has increased, and illumination has become indispensable in daily life. Thus, intelligent illumination systems have been developed. Currently, indoor illumination control systems commonly seen in the market require the following sensors:

1. Occupancy sensor: a function of the occupancy sensor is to automatically turn the lights on when a person enters a room and turn the lights off when the person leaves. The occupancy sensor comes handy for one who carries items with both hands when entering a room such as a laundromat, a kitchen, or a workplace.

2. Vacancy sensor: a function of the vacancy sensor is to turn the lights off when the person leave a room, but the person needs to manually turn the lights on when entering the room. The vacancy sensor is an ideal choice for the bedroom, as the lights would not be automatically turned on when one's partner walks in during sleep. The vacancy sensor is a preferable choice if the household includes a pet.

3. Daylight sensor: the daylight sensor dims or turns lights off when sufficient daylight is provided in a room. The daylight sensor is an ideal choice for a room with many windows, such as a family room or a sun room. This type of sensor fully uses the available daylight, reduces dependency on electrical light, and helps lower electricity costs.

4. Passive infrared sensor (PIR): the passive infrared sensor (PIR) detects temperature changes so as to determine whether someone enters a room and whether lights should be turned on. The PIR is suitable for being installed in a small and closed environment so as to detect obvious movements of a person, because the design thereof is for detecting primary movements. The strength thereof is to easily detect a person walking in or out of a space. However, a weakness thereof is that the PIR automatically turns the lights off when the PIR determines the person is not active, such that the sudden darkness causes inconvenience because the person needs to be active in order to keep the lights on.

5. Ultrasonic sensor: whether an object is moving or not in a room may be detected by reflection generated by transmitting ultrasound to the object and detecting acoustic frequency offsets between transmissions and reflections. The ultrasonic sensor is adept at detecting slight movements, such as typing, and does not need a surrounding with a bare sight vision.

6. Wireless sensor: the wireless sensor does not require new wirings and is easily installed and programmed. Each of the batteries in the wireless sensor lasts ten years, and the wireless sensor may be easily relocated for reconfigurations. Additional sensors may be installed at any time so as to expand a coverage area of the sensor in the room. These sensors transmit radio frequency (RF) signals to a dimmer and a switch, and the RF signals instruct them what to do. These sensors operate in a low frequency band (434 MHz) so as to avoid interference of other wireless devices. Wired sensors directly connected to a light control device are suitable for new buildings and battery changes are not required.

Conventional indoor illumination control technologies only control switching of lights without having dimming or toning functions. However, current LED-based illumination systems not only enhance luminous efficiency but are also capable of dimming and toning. By combining daylight sensors and room temperature sensors under computer control, the intelligence of the illumination system may be improved. However, since current illumination systems do not detect locations, identities, and emotions of indoor users, there is much room for improving the intelligence of the current illumination systems. In the modern society, buildings such as residential buildings, shopping malls or skyscrapers are becoming colossal, and people may easily get lost in a shopping mall and lose their ways. Thus, an indoor positioning system is a must have. Although many mobile communication devices have a built-in global positioning system (GPS), the GPS function cannot be used indoors. Furthermore, current indoor positioning systems require another positioning network to be structured, such as the indoor positioning system disclosed in Taiwan Patent Application No. 97112483. Moreover, the user may also require a dedicated positioning label. Therefore, the system is costly and inconvenient. In view of the above, the invention enables cost effective indoor illumination by developing an easy to use illumination system with positioning functions.

SUMMARY OF THE INVENTION

An illumination control system of the invention employs a user positioning technology as a basis of an LED illumination control and as a dimming mechanism based on a distance between the locations of the user and a lamp.

An illumination control system of the invention is to use a user positioning technology as a basis of an LED illumination control for adjusting LED brightness and further adjusting LED lightness, color temperatures and colors based on emotions of the user or room temperatures.

According to an embodiment of the invention, an illumination control system provides wireless data transmission with lamps through a mobile communication application installed in a smart phone by downloading a mobile communication application. The system adopts a Bluetooth transmission technology, in which a microcontroller of a lamp stores a location of a lamp with latitude-longitude values and height values, and a low power wireless communication module of the lamp is capable of providing wireless data transmission with the smart phone, such that a user may read the location of the lamp with the latitude-longitude values and height values by the smart phone and obtain a location of the user with latitude-longitude values and height values through related algorithms to fulfill an indoor positioning function.

According to an embodiment of the invention, an illumination control system controls illumination of a lamp by downloading a mobile communication application. By using the mobile communication application suitable in smart phones defined in the market, a user may install the mobile communication application to a smart phone and control illumination of a lamp lighting system through wireless data transmission. The related control functions include:

1. The lamp lighting system interacts with a mobile communication device carried by the user through a wireless communication module of the lamp to position a location of the user, so as to provide proper lighting at the location of the user and to immediately dim or even turn off lights where no one is present.
2. Illumination intensity and presence of the user may be determined based on a daylight sensor in order to compensate illumination intensity by wirelessly adjusting related lighting facilities, such that a location with presence of the user is provided with sufficient illumination, thereby achieving energy savings and carbon reduction.
3. Illumination with various colors and brightness is provided based on a mobile emotion sensor an indoor user wears, in which the emotion sensor detects emotions of the indoor user.
4. Proper illumination is provided based on voice commands of the indoor user.
5. Proper illumination is provided based on ages and habits of the indoor user. Stronger intensity illumination is provided when seniors are at present so as to avoid bumping or falling due to poor vision.
6. Indoor users are suggested to move to suitable locations for activity based on outdoor light coming into each indoor location.
7. Illumination without shadow is provided by integrating each of the illumination sources.
8. Intensity of sunlight is controlled by a combination of curtain control or electrochromic (EC) mirrors.
9. Awakening the indoor user by controlling lights, such as adjusting illumination by focusing light sources on a face of the indoor user as if exposed under sunlight, so as to prevent alarms from going off and interrupting other people who are not ready to wake up.
10. Color temperatures of LEDs are adjusted based on room temperatures by providing cold colors of the LEDs with high room temperatures,warm colors with low room temperatures, cold colors of the LEDs in the summer, and warm colors in the winter.

To make the aforesaid features and advantages of the invention more comprehensible, several embodiments accompanied with figures are described in detail below to further describe the invention in details.

DESCRIPTION OF EMBODIMENTS

Figure 1:
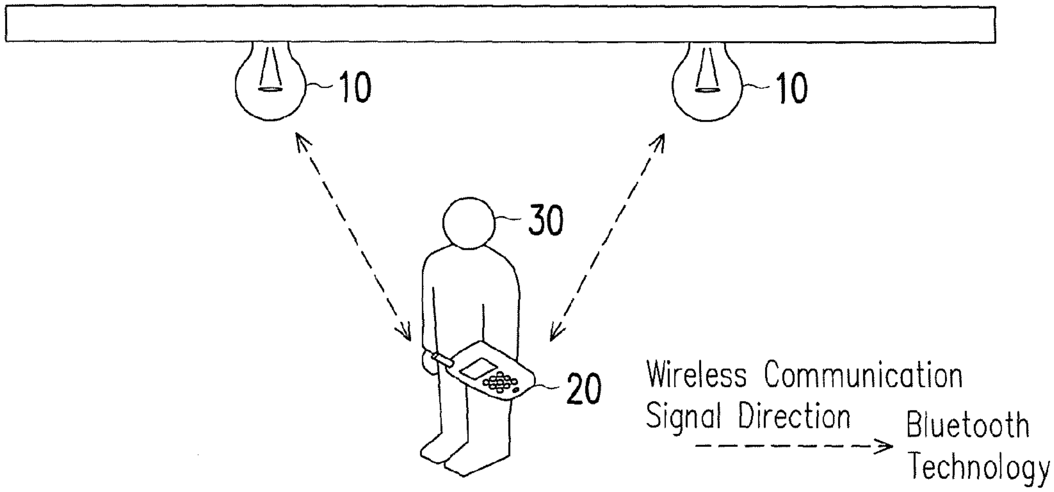
FIG. 1 illustrates a graph of using an illumination control system of the invention.

FIG. 1 illustrates a graph of using an illumination control system of the invention. The illumination control system is provided with light sources including lamps such as general fluorescent lamps, incandescent lamps, halogen lamps, and LED lamps which may be used for indoor illumination. An LED lamp is used as a system light source in a preferred embodiment of the illumination control system. A primary purpose thereof is to apply an indoor lamp 10 with a built-in microcontroller for recording a location of the lamp with three-dimensional coordinates or latitude-longitude values and height values. When a user 30 uses a mobile communication device 20, the mobile communication device 20 reads the location of lamp with the three-dimensional coordinates or the latitude-longitude values and height values which are recorded in the microcontroller in the indoor lamp 10 through wireless transmission technology, so as to identify the location of the user 30 with latitude-longitude values and height values. A smart phone is adopted in the present embodiment, although other equipments having a wireless signal transmission function, such as tablet computers, laptops, and wearable computers such as eyeglasses, watches, bracelets, motion monitoring bracelets may be adopted as well. The three-dimensional coordinates or the values of latitude-longitude and heights of the lamp recorded in the microcontroller which is in the lamp 10 is read through wireless transmission technology, so as to confirm the values of latitude-longitude and heights at which the user 30 is located. If the user 30 is in a location having a plurality of the indoor lamps 10 each containing a unique latitude-longitude values and height values, the mobile communication device 20 installed with a mobile communication application 21 (e.g. a control program) and held by the user 30 calculates the related three-dimensional coordinates or latitude-longitude values through three-point positioning algorithms, so as to accurately obtain the location of the user 30 and to achieve indoor positioning.

Figure 2:
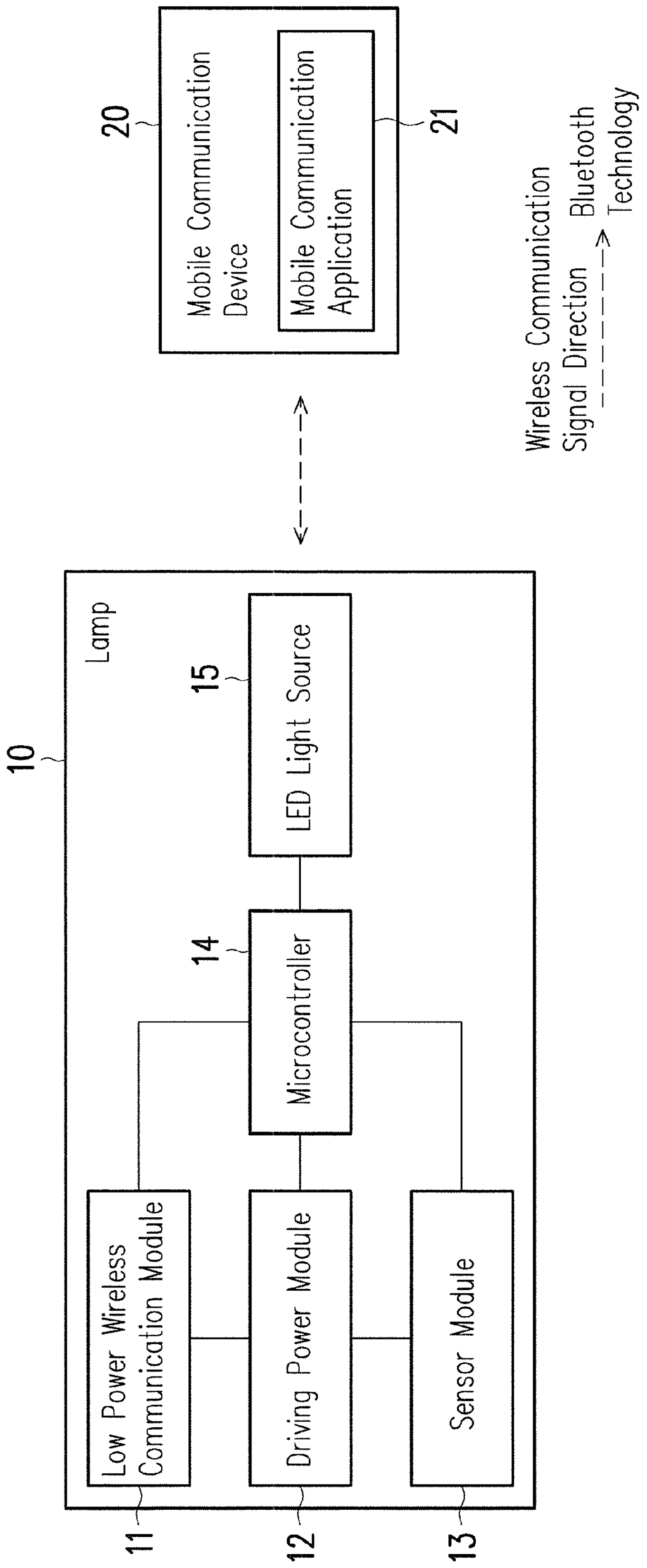
FIG. 2 is an architecture chart illustrating the illumination control system of the invention.

FIG. 2 is an architecture chart illustrating the illumination control system of the invention. A primary purpose thereof is to control changes in lighting and position a location of the user. The illumination control system includes the indoor lamp 10. A number of the indoor lamp 10 may be one or plural. The indoor lamp 10 may be installed indoors or outdoors, and the indoor lamp 10 include a microcontroller 14; a low power wireless communication module 11; a sensor module 13; an LED light source 15; and a driving power module 12.

The microcontroller 14 contains a function of pulse width modulation (PWM) or a function of adjusting voltages or currents supplied to LED light source driving circuits for controlling light sources of an LED light source 15, and the microcontroller 14 is stored with a location of the indoor lamp 10 with three-dimensional coordinates or latitude-longitude coordinate values and heights from the ground surface and a location of the indoor lamp 10 is obtained by reading the three-dimensional coordinates or latitude-longitude values and height values.

The low power wireless communication module 11 may wirelessly transmit data with the mobile communication application 21 installed in the mobile communication device 20, and the lower power wireless communication module 11 may adopt Bluetooth technology, and other wireless transmission technologies, such as Wi-Fi, ZigBee and ANT+, may also be adopted.

The sensor module 13 may detect environmental changes and may be configured to detect data of various changes in an environment by combining different detection modules, wherein detection contents includes all kinds of changes in the environment, such as intensity of lights, color temperatures, environmental temperatures, and levels of humidity, carbon dioxide ($CO_2$), carbon monoxide (CO) and methane in the air.

The LED light source 15 provides illuminating rays, wherein the indoor lamp 10 may adopt an LED as a light source, regardless direct current (DC) or alternating current (AC).

The driving power module 12 with an electric power source thereof may be connected to an external power, such as general commercial power or a DC power source, and may also install an energy storage battery as a power source. A power source suitable for the LED lamp of the invention may be the AC power source or the DC power source. An AC-type LED lamp only requires an AC-DC converter, while a DC-type LED lamp may use a DC-DC converter directly.

In addition, program functions of the mobile communication application 21 may be installed in any mobile communication device 20. The mobile communication device 20 of the present embodiment adopts a smart phone, and other equipments having a wireless signal transmission function, such as tablet computers and laptops, wearable devices may be adopted as well. Data transmissions are provided wirelessly between the mobile communication device 20 and the lower power wireless communication module 11 of the lamp 10, and the preset latitude-longitude coordinates and height values stored in the microcontroller 14 is read through wireless data transmission technology. When the user reads the preset latitude-longitude coordinates and height values of the lamp 10 proximate to the lamp 10 by using the mobile communication device 20, it may be inferred that the latitude-longitude coordinates and height values are a location with the latitude-longitude coordinates and height values of the user. The mobile communication application 21 may also be installed in any wireless communication equipment having a function of connecting to an Internet. The lamp 10 is maneuvered remotely by using the function of the Internet.

The driving power module12 of the present embodiment is connected to the external power source and provides operating electricity to the microcontroller 14, the low power wireless communication module 11, the sensor module 13 and the LED light source 15 through electrical connections. The sensor module 13 may detect environmental changes and transmit data to the microcontroller 14 for the microcontroller 14 to control the LED light source 15 based on the data transmitted by the sensor module 13, so as to attain the purpose of controlling lights. The microcontroller 14 stores the location of lamp 10 with values of the latitude-longitude coordinates and heights, and transmits data through the low power wireless communication module 11 and the mobile communication device 20 installed with the mobile communication application 21, such that the user obtains the values of the latitude-longitude coordinates and heights of the lamp 10 stored in the microcontroller 14 by the mobile communication device 20 installed with the mobile communication application 21.

Figure 3:
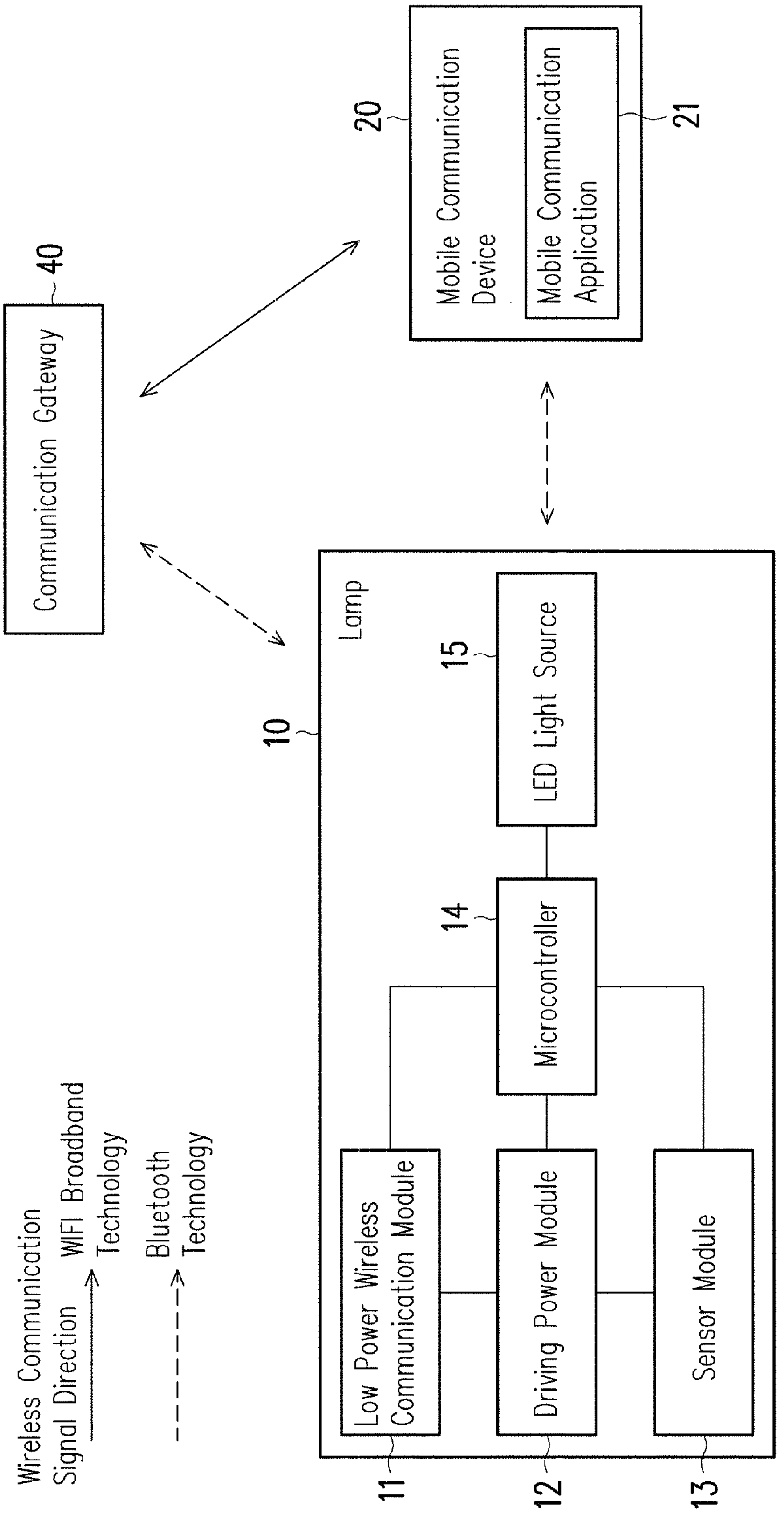
FIG. 3 is a structural diagram illustrating the illumination control system module of a home network of the invention.

FIG. 3 is a structure diagram illustrating the illumination control system module of a home network of the invention. The plurality of lamps 10 are provided in a household and operated wirelessly through a central control system (communicate gateway 40), such that a user may also remotely maneuver the lamps 10 of the household. The user may connect to the Internet through the mobile communication device 20 installed with the mobile communication application 21 and performs remote maneuvering through the Internet and the central control system (communication gateway 40). The low power wireless communication module 11 of the lamp 10 may transmit data wirelessly with the central control system (communication gateway 40). The driving power module 12 is connected to an external power source and provides operating electricity to the microcontroller 14, the low power wireless communication module 11, the sensor module 13 and the LED light source 15 through electrical connections. When no one presents in the household, a function of the sensor module 13 may be activated. In case a movement of a related object is detected, the LED light source 15 is turned on through the microcontroller 15, and a related data is transmitted to the central control system (communication gateway 40) through the low power wireless communication module 11 and is sent to the mobile communication device 20 held by the user or a related security entity through the Internet, so as to ensure household security.

Figure 4:
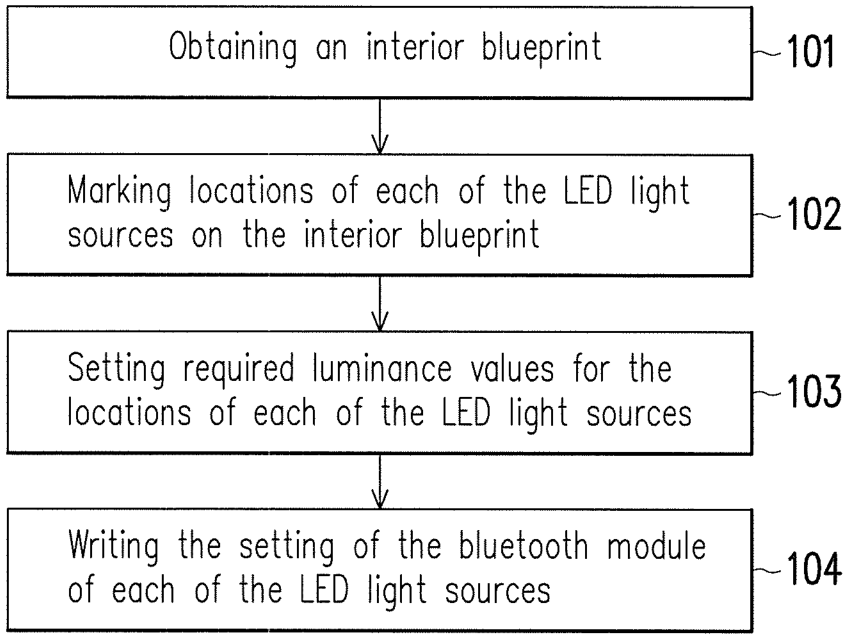
FIG. 4 is a flow chart illustrating a setting of the illumination control system of the invention.

FIG. 4 is a flow chart illustrating a setting of the illumination control system of the invention including:

Step 101: obtaining an interior blueprint, which may be obtained from an interior designer or architect, or by measuring the interior on your own.

Step 102: marking locations of each of the LED light sources in the interior blueprint. A way of marking may be completed by obtaining latitude-longitude coordinates of the outermost four corners of a building through GOOGLE MAP, and obtaining the latitude-longitude coordinates of each of the LED light sources with interpolation calculation. The height coordinate of each of the LED light sources may be estimated by the altitude sensor built-in the mobile communication devices. The LED light sources include ceiling lamps, wall lamps, recessed lamps, etc. A Bluetooth communication module may be installed on lamp devices or lamp sockets, and may also be installed in LED light bulbs or light tubes. A preferable way for installing the Bluetooth communication module in a lamp device with a plurality of lamps is to install it on the lamp device. A set of lamps are dimmed or toned as a whole, and an LED lamp embedded with a Bluetooth module may directly be selected for any LED lamp in need of individual dimming or color adjusting.

Step 103: setting required luminance values for the locations of each of the LED light sources based on an illumination design of an interior designer, or individual or family needs and based on a lighting standard for public areas promulgated by a nation.

Step 104: writing in and setting the Bluetooth module in each of the LED light sources, with coordinates of latitude-longitude and heights, default luminance values, ranges of permissible luminance values, etc. A method for writing in may be processed after directly connecting to each of the Bluetooth modules through an APP of the mobile communication device, and may also be processed after connecting to each of the Bluetooth modules one by one through the central control system (communication gateway 40).

After the settings are completed, ways of controlling indoor lighting may be divided into two types. A first type is a decentralized control, which directly controls LED light sources of each of the lamps through an individual mobile communication device; and a second type is a centralized control, which a communication gateway controls LED light sources of each of the lamps through a wireless network (WIFI/BT4.0 or entirely BT4.0) or a power line communication (PLC), or Ethernet/BT4.0.

[Decentralized Control]

Scenario 1: Having the Mobile communication Device 20

Figure 5:
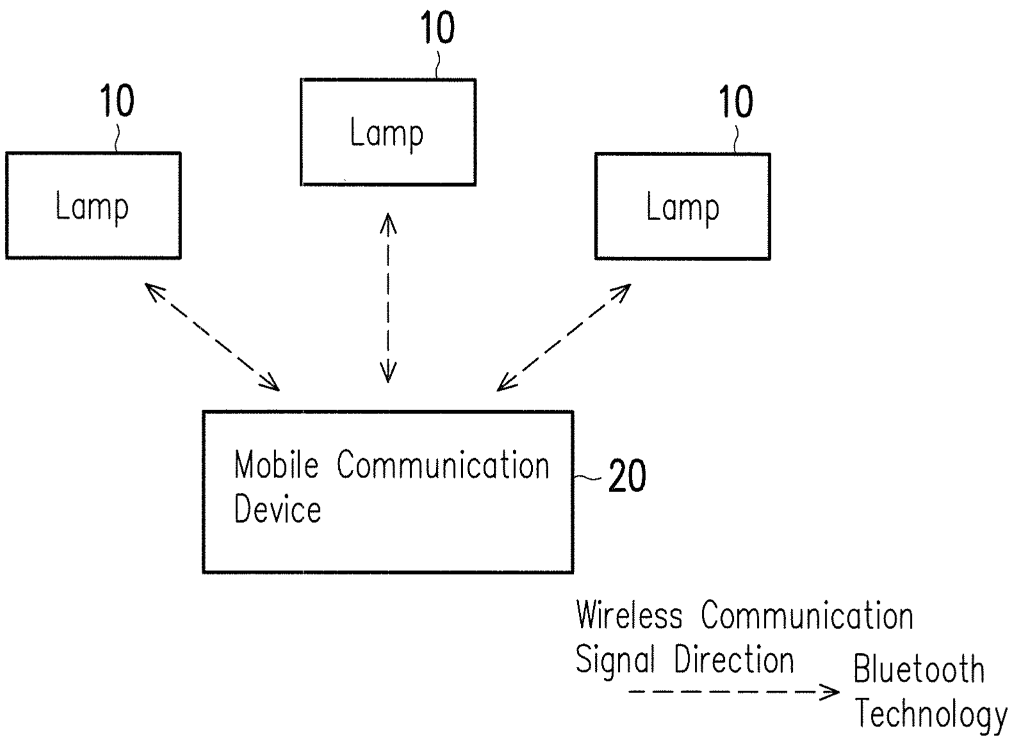
FIG. 5 is a schematic view illustrating a local area network of the illumination control system of the invention.

FIG. 5 is a schematic view illustrating a local area network of the illumination control system of the invention, which is implemented primarily by the mobile communication device 20, such as a mobile phone or a tablet computer, and is processed with an APP program. A preferable method of implementation is as follows: a user activates an APP installed in the mobile communication device 20 that shows an icon of the lamp 10 to be controlled, and performing dimming or toning after directly clicking the icon. The mobile communication device 20 is deemed as a controller for the lamp 10. The user may also perforin dimming or toning by voice commands. This type of decentralized control is more suitable for anyone living along or has his/her own room, or a household having a small family.

Scenario 2: Wearing Accessories—a Bracelet 50 or an ID Badge

Figure 6A:
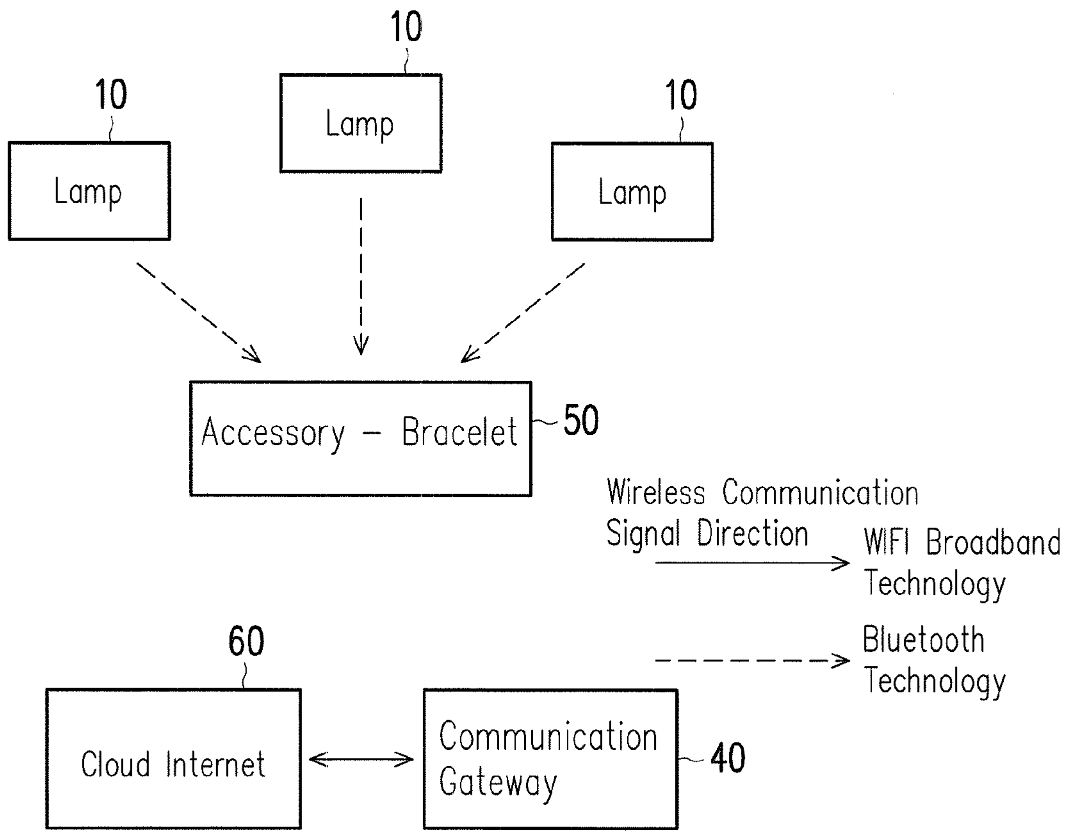
FIG. 6A is a schematic view illustrating a local area network of the illumination control system of the invention
Figure 6B:
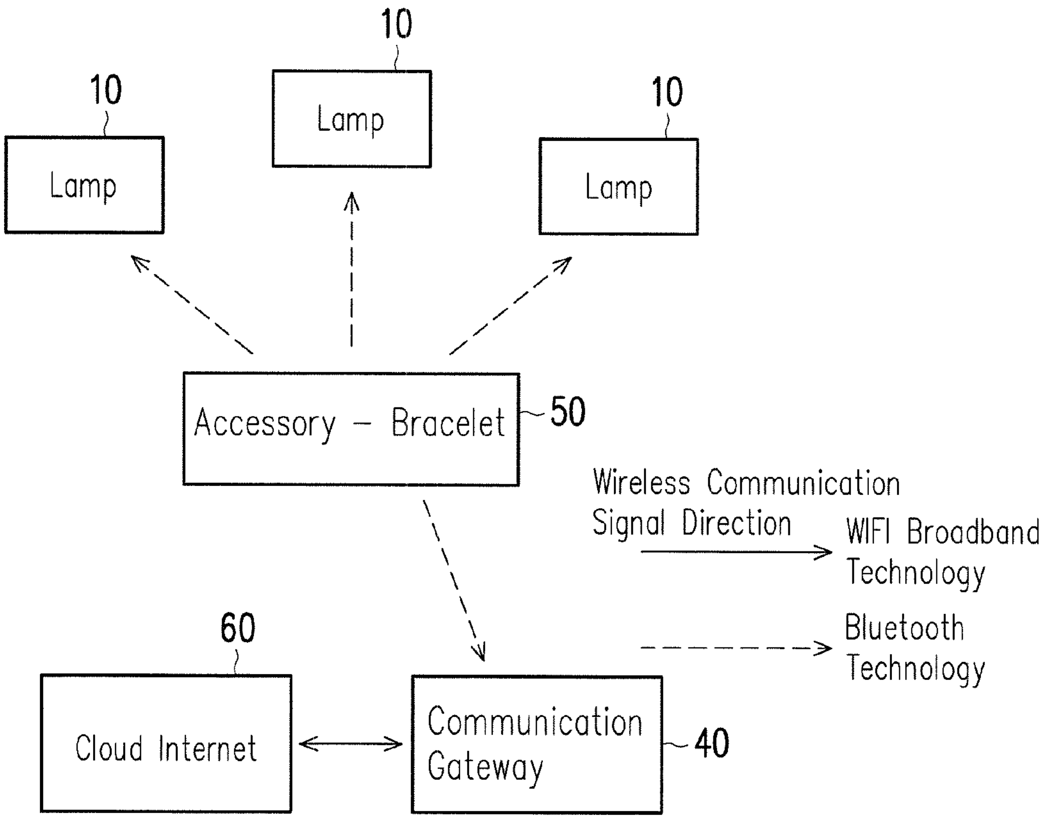
FIG. 6B illustrates a local area network of the illumination control system of the invention.

FIG. 6A is a schematic view illustrating a local area network of the illumination control system of the invention. A user may not carry a mobile phone in a household or an office, and an accessory installed with a wireless communication module may be worn to be as a sensing equipment. The accessory may be designed as a bracelet, an ID badge, a watch and a necklace, etc. The accessory—bracelet 50 is adopted in the present embodiment. A communication function of Bluetooth technology 4.0 is adopted in the present application, and WIFI, ZigBee, and ANT+ may also be adopted. A preferable embodiment of the energy saving accessory—bracelet 50 is installed with a module having a version of the Bluetooth 4.0 or 4.1 or above. The Bluetooth module 4.0, first of all, uses a master node module for the accessory—bracelet 50 to scan and read coordinates of latitude-longitude and heights of three proximate LED lamps (Bluetooth slave node module) and calculate locations of the three LED lamps. Then, as a schematic view shown in FIG. 6B illustrating a local area network of the illumination control system of the invention, the master node module is immediately converted to the slave node module and broadcasts a location (with coordinates of latitude-longitude and heights). The lamp 10 is switched to a master node at a scheduled time and scans for obtaining a broadcasting location of the accessory—bracelet 50. Due to that the lamp 10 has its own location with coordinates of latitude-longitude and heights, and also has the location of the accessory—bracelet 50 with latitude-longitude and heights, a distance therebetween may be calculated and a required luminance may be calculated based on a most proximate accessory—bracelet 50 so as to determine whether to dim or light up. Accordingly, the accessory—bracelet 50 not only transmit positioning data of its own location to the central control system (communication gateway 40). As shown in FIG. 6B, a lighting control may also be performed in coordination with the lamp 10, which is fast and simple because not all of these functions are required for connection and write in as they could be depended on broadcasting and scanning.

The lamp 10 in another embodiment is simply deemed as a Bluetooth master node, and all of the accessories—bracelet 50 are deemed as slave nodes. The lamp 10 scans and obtains a received signal strength indicator (RSSI) broadcasted by a proximate accessory—bracelet 50, calculates a distance therebetween with RSSI, and provides corresponding luminance by self-adjusting dimming. This is simply for energy saving and carbon reduction, and settings of coordinates of latitude-longitude and heights of any lamp 10 are not necessarily required.

[A Centralized Control]

A centralized control is suitable for a location where many people stay, such as a living room in a house, or a place like offices where people stay.

Scenario 1: Carrying a Mobile Communication Device

Figure 7:
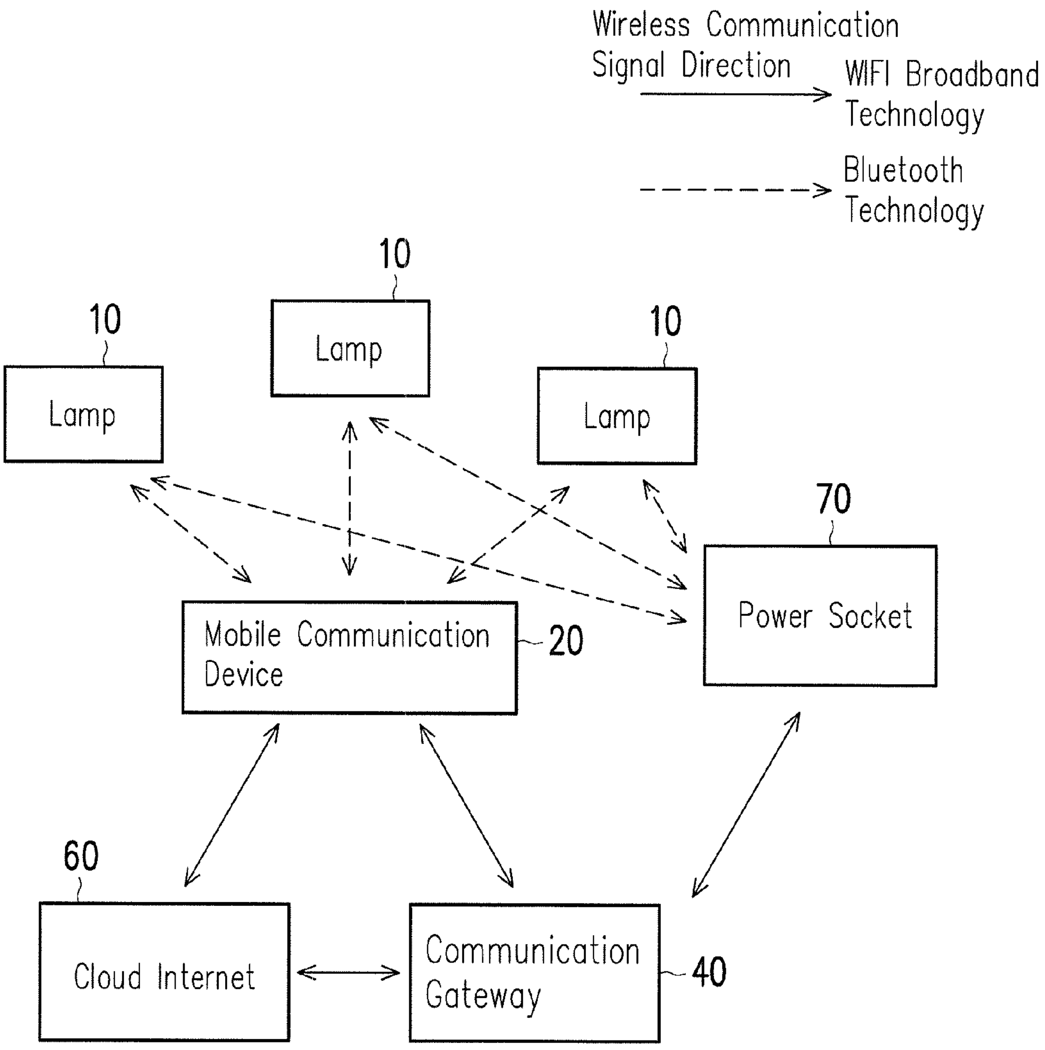
FIG. 7 is a schematic view illustrating a local area network of the illumination control system of the invention.

FIG. 7 is a schematic view illustrating a local area network of the illumination control system of the invention. A user activates a mobile communication application (generally known as APP) of the mobile communication device 20, which scans to obtains latitude-longitudes of at least three of the LED lamp 10, calculates locations thereof, and transmits the locations thereof to the communication gateway 40 through WIFI. The communication gateway 40 determines whether to lighten or dim each of light sources based on locations of proximate user, required luminance, distances between each of the light sources and the proximate user. A method thereof is to build-in a WIFI/BT4.0 conversion interface circuit in a power socket 70, transmit a WIFI command of the communication gateway 40 to the WIFI/BT4.0 conversion interface circuit built in the power socket 70 where the WIFI command is converted into a BT4.0 command for broadcasting to individual light source. If deemed necessary, the communication gateway 40 may transmit a location of the user to a cloud Internet 60. Another embodiment adopts the mobile communication device 20. The present embodiment adopts a smart phone, which transmits a physical location through 3G or 4G to the cloud Internet 60 for the cloud Internet 60 to determine and control tones of each light source by sending back with signals.

Please be noted that majority of men (more than 60%) put their mobile phones in their pockets, while majority of women (more than 60%) put their mobile phones in their handbags. However, as long as a user activates a mobile communication application configured for positioning the mobile communication device 20, an accurate position at present may still be obtained through a wireless communication network of the invention. Besides, the wireless communication network may transmit the position to the communication gateway 40. Then the communication gateway 40 determines a required luminance all at once, just like a central air conditioning.

Figure 8:
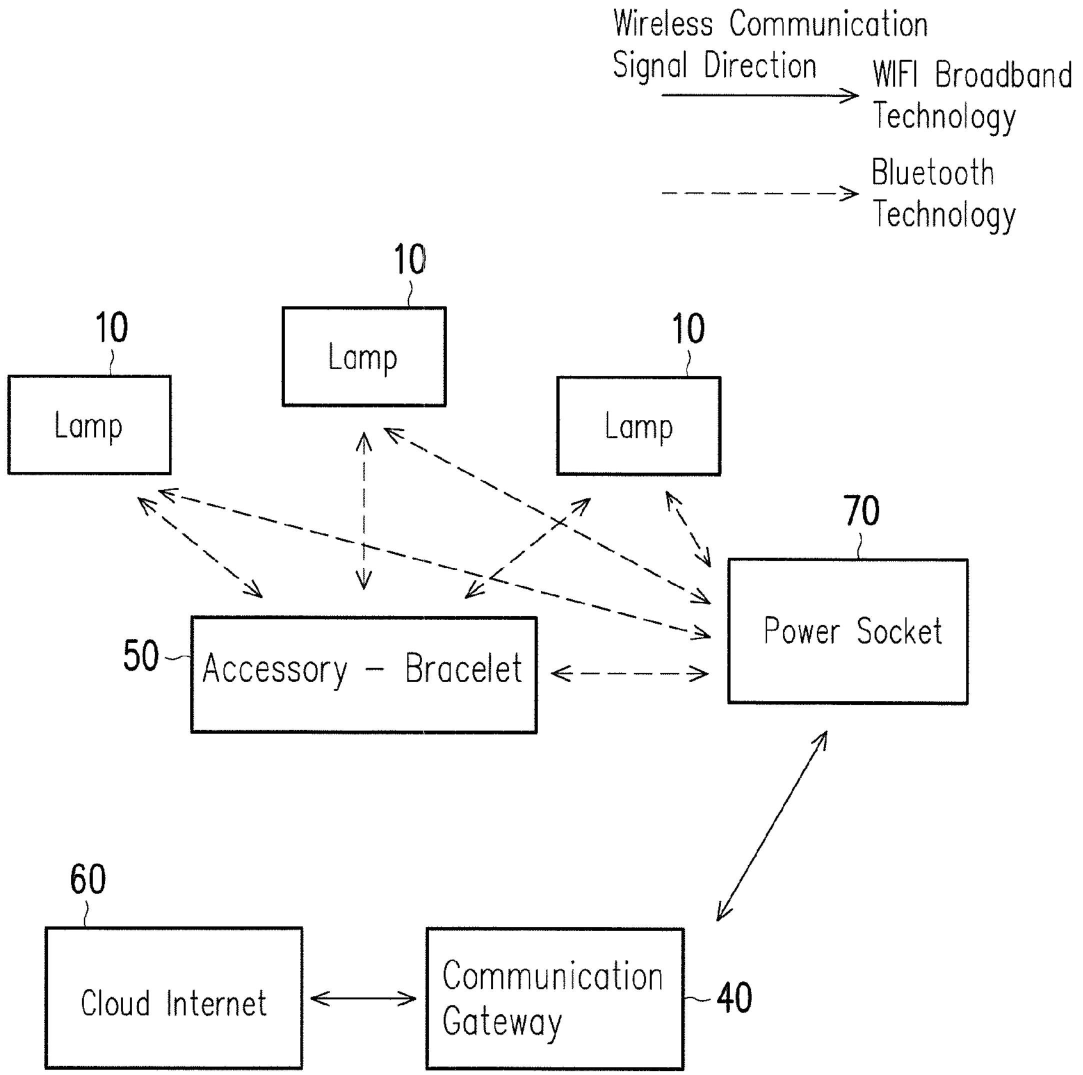
FIG. 8 is a schematic view illustrating a local area network of the illumination control system of the invention.

Scenario 2: Wearing an Accessory—Bracelet 50 or other Accessories such as an ID Badge, a Watch, a Pair of Eyeglasses FIG. 8 is a schematic view illustrating a local area network of the illumination control system of the invention. A mobile communication device may be not used in a household or an office. Then an accessory—bracelet 50 may be worn, wherein the accessory—bracelet 50 has at least a BT4.0 communication function, or WIFI/BT4.0. The preferable embodiment is to adopt a BT4.0 module. The module first adopts a master node module for scanning and reading coordinates of latitude-longitudes and heights of at least one proximate lamps 10, or preferably more than three proximate lamps 10, calculating a locations of its own, and immediately converting from the master node module to a slave node module to broadcasting the location of its own (the coordinates of latitude-longitude and heights), which is received by the proximate accessory—bracelet 50 (WIFI/BT4.0 master node) and then transmitted to the communication gateway 40 through WIFI. The communication gateway 40 determines whether to lighten or dim each of light sources based on locations of proximate user, required luminance, distances between each of the tight sources and the proximate user. A method thereof is to build-in a WIFI/BT4.0 conversion interface circuit in a power socket 70, transmit a WIFI command of the communication gateway 40 to the WIFI/BT4.0 conversion interface circuit built in the power socket 70 where the WIFI command is converted into a BT4.0 command for broadcasting to individual light source. If deemed necessary, the communication gateway 40 may transmit a location of the user to a cloud Internet 60. In addition, an accessory having the same WIFI/BT4.0 master node as that of the bracelet 50 also includes a GOOGLE GLASS or wearable device, which is also one of embodiments illustrating accessories in the invention.

An accelerometer may further be built in the accessory—bracelet 50 for determining whether users are active or sleeping and resting. Since the accelerometer of the accessory—bracelet 50 may detect subtle movement of hands such as typing, reading and turning pages of literal works and newspapers, sufficient illumination may be maintained. If watching TV is detected, lower luminance may be provided.

Figure 9:
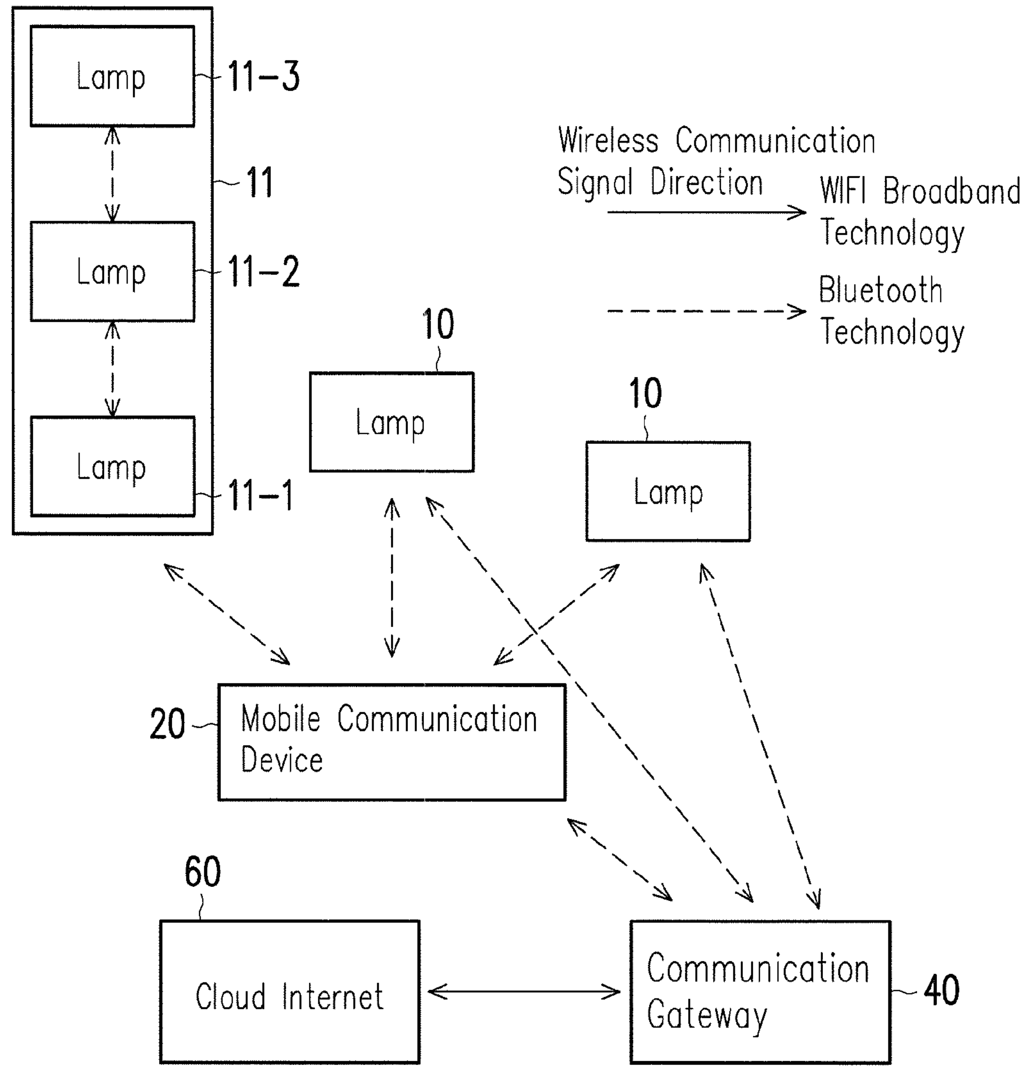
FIG. 9 is a schematic view illustrating a local area network of the illumination control system of the invention.

FIG. 9 is a schematic view illustrating a local area network of the illumination control system of the invention. A bracelet or an ID badge with the Bluetooth 4.0 module may be used in a compact living space, such as a living space for a person living alone or a micro apartment, or a hotel room, where such a space only requires a notebook computer plugged with a Bluetooth Dongle, or a computer or the mobile communication device 20 having a Bluetooth communication function. The module first adopts a master node module for scanning and reading coordinates of latitude-longitudes and heights of at least one proximate lamps 10, calculating a locations of its own, and immediately converting from the master node module to a slave node module to broadcasting the location of its own (the coordinates of latitude-longitude and heights), which is received by a proximate computer having the Bluetooth communication function or the mobile communication device module 20 (the master node). The computer or the mobile communication device 20 determines whether to lighten or dim each of light sources based on locations of proximate user, required luminance, distances between each of the light sources and the proximate user. If deemed necessary, the communication gateway 40 may transmit a location of the user to a cloud Internet 60. In one embodiment, several neighboring lamps 11 having the Bluetooth communication function may be grouped into a Piconet or Scatternet as shown in FIG. 9. The mobile communication device 20 may send a control signal to the grouping lamps 11, or send a control signal to the lamp 11-1 then hop the control signal to lamp 11-2 and then lamp 11-3.

Figure 10:
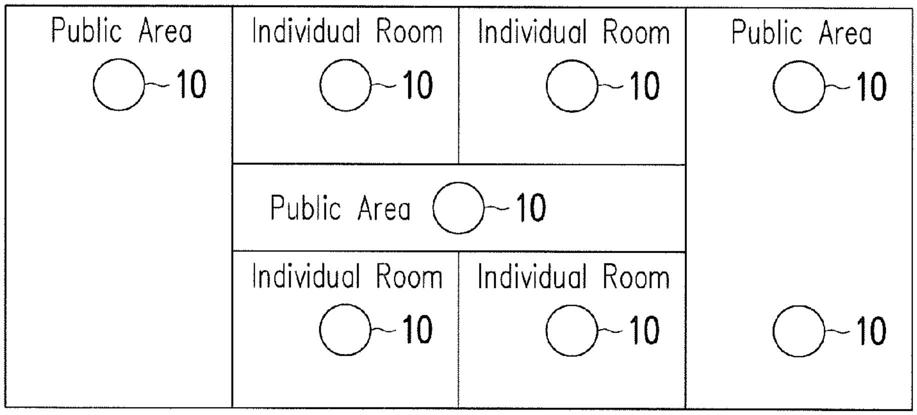
FIG. 10 is a sample figure illustrating an indoor lighting configuration of the illumination control system of the invention.

Composite Control, Combination with Decentralized Control, and Centralized Control FIG. 10 is a sample figure illustrating an indoor lighting configuration of the illumination control system of the invention. Every user has a decentralized control priority on individual rooms, while a centralized control is applied in public areas. The wireless communication module built in the lamp 10 for individual rooms has preferably dual mode Bluetooth 4.0 technology, such as CC2560 or CSR 1000 or 1010. In this way, if no one stays in an individual room, the lamp 10 is turned off by the centralized control. In other words, the centralized control is not in charge of turning on and off lamps in individual rooms. When the user is present in an individual room, whether the lamp of the room is turn on or off is determined by the user in the room. However, information regarding the presence of the user will be provided to a centralized controller. The centralized controller periodically scans for states of the lamp 10 to determine whether to turn off the lamp 10. Alternatively, the lamp 10 broadcasts latitude-longitude and heights of the lamp 10, as well as states of related additional sensors, such as temperature sensors and gas sensors. Locations of illumination sensors may directly be combined with the lamps 10, fixed at indoor areas frequently used, or built in bracelets and ID badges. Alternatively, the illumination sensors within the mobile communication device may be adopted for wireless communication capability thereof to transmit sensing values thereof to light sources, BT4.0/WIFI, or the communication gateway, and the sensing values may be deemed as feedback values for modulating and controlling light source illumination.

Embodiment 1

Figure 11:
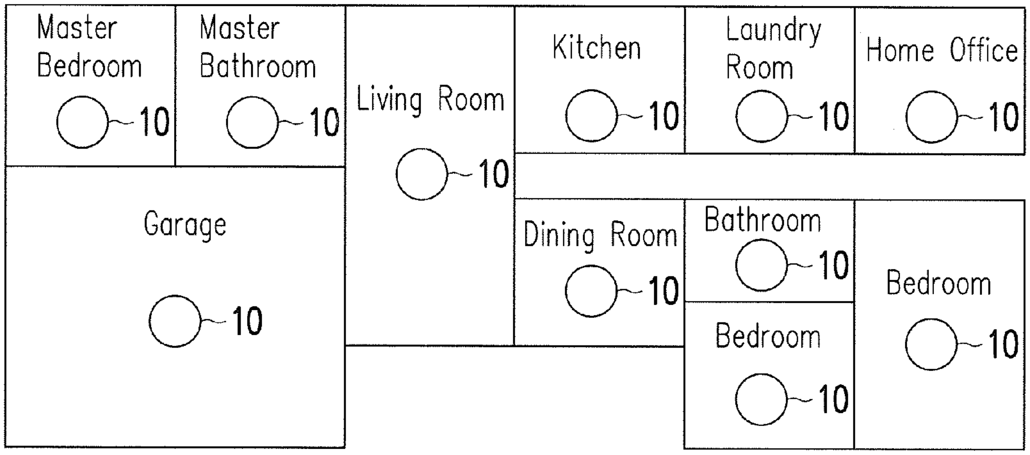
FIG. 11 is a sample figure illustrating an indoor lighting configuration of the illumination control system of the invention.

FIG. 11 is a sample figure illustrating an indoor lighting configuration of the illumination control system of the invention. First, a command may be directly transmitted from a personal cellular phone to the lamp 10 in a bedroom, such as the lamp 10 in the bedroom which may be configured for having a function of a vacancy sensor. The lamp is not turned on automatically when people come in and out during your sleep. A method for turning on the lamp 10 is through a cellular phone or a bracelet, or through a cellular phone or a bracelet with a voice command. Sufficient lighting is maintained in children room so children would not be afraid. A function of occupancy sensor may be set for an entrance where no one stays to turn the lamp on when presence of the user is detected and to turn the lamp off when the user leaves. The lamp having a function of a daylight sensor may be set up for places with many windows, such as a living room, a balcony and a yard, and light adjusting will be based on installation and illumination setup. The lamp having a function of occupancy sensor may be set up for a garage or a basement, and the lamp will be turned on in presence of the user and turned off without presence of the user.

Controlling the lamp in a bathroom may prevent the user from searching for a switch in a dark midnight, and an application of a dimmer may prevent strong lights in midnights. A bracelet may be worn while taking a shower so as to ensure continuing illumination and send out a distress signal based on acceleration of the bracelet with a fall in the bathroom. If a passive infrared sensor (PIR) is adopted, the lamp may be on and off all the time during a shower.

Typically, every country has its own illumination standard table for regulating requirements for lighting in every location such as households, schools and offices. A system layer, first of all, sets up standard illumination for locations of each of the light sources according to the national illumination standard table, and then sets up illumination required by each user. For example, seniors require higher illumination. The system layer checks locations of each user at all times and lightens proximate light sources of the locations of the user based on their status, ages and special requirements in order to provide sufficient luminance, and dims or turns off the proximate light sources automatically for areas where no presence of the user is detected, such that an issue of not turning off lights when leaving may be effectively avoided.

A Bluetooth module of a light source may treat switches on walls as switches for resetting so as to prevent the light source from being turned on or off in case a user may not carry a bracelet, a cellular phone or an ID badge. The switches on the walls are used only for urgent situations, as the light source is usually under wireless control.

One advantage of the invention is that switches on walls are not required. Switches already installed on walls of a house may remain as long as they are always in an ON state. For new houses to be built, costs for wirings and switch box installations may be saved, so as to leave more flexibility for interior decoration. As far as illumination is concerned, when remodeling a room, a lamp only requires power line arrangement and there is no need to take a location of a switch box into account, because the light is under wireless control.

A cellular phone or a bracelet reports locations (every 10 seconds or when locations are changed) to the communication gateway. For example, continuing working in front of a computer would not change a location of a user and there is no need to update new locations to the communication gateway. The system layer receives commands from the communication gateway based on locations of each user, and reads states of each light source, ambient illumination, illumination proximate to each user to determine whether sufficient illumination is provided so as to lighten or dim a certain light source. In essence, the communication gateway commands BT4.0 SLAVE to turn on or off, or dim each of the light sources through WIFI/BT4.0.

Embodiment 2

A multifunctional bracelet is provided, including an accelerometer, a Bluetooth communication module, a microcontroller and at least two buttons. An indoor LED light Bluetooth technology is further integrated, and at least includes four modes such as an indoor positioning mode, a positioning control lamp mode, hands-on remote control mode and an emergency mode.

Figure 12:
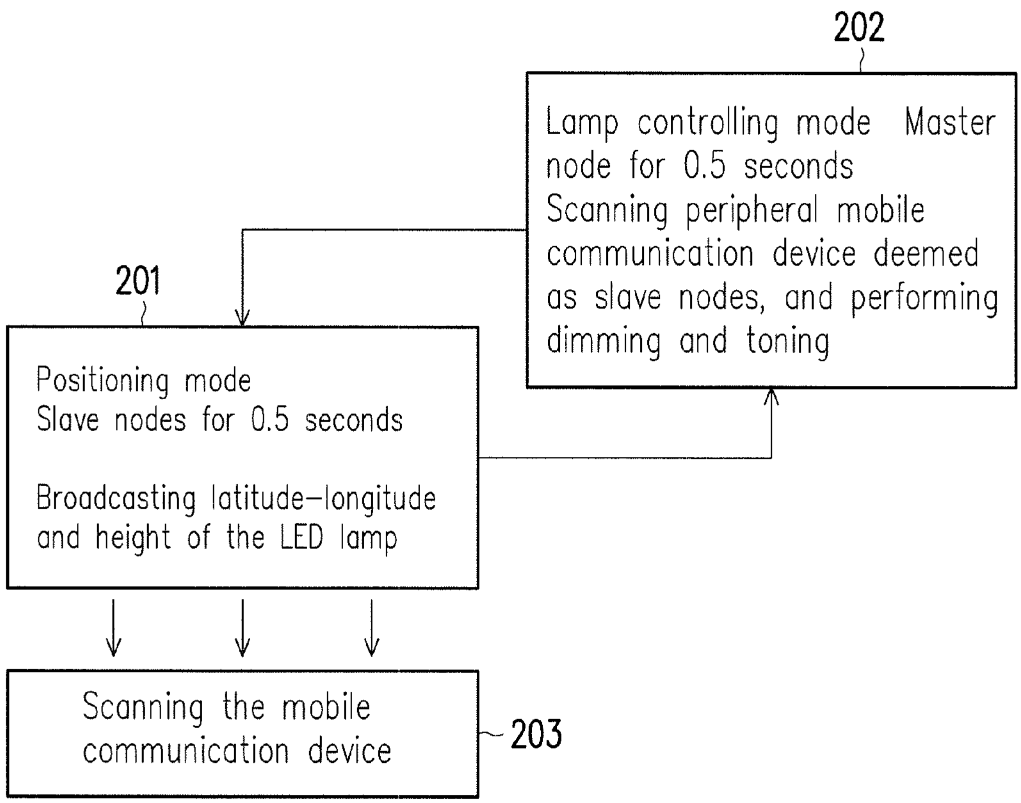
FIG. 12 is a flow chart illustrating an LED lamp in positioning/dimming modes.

FIG. 12 is a flow chart illustrating an LED lamp in positioning/lamp control (dimming) mode. According to the concept of time sharing, the positioning mode and the lamp control mode are updated in every 0.5 seconds. The reason being that: assuming an indoor walking speed is approximately 3600 m/hr, which means 1 m/s in average and is updated in every 0.5 seconds. In fact, a delay or error of only 0.5 meters is still within a tolerable range.

A Bluetooth low power module of an LED light source is operated in a slave node module 201 and broadcasts in every 0.5 seconds. A broadcasting cycle may adopt 30 ms, and contents of broadcasting is primarily a location of the LED light source, such as latitude-longitude and heights of the LED light source, which are open to a proximate mobile communication device 203 for scanning. Therein, assuming that a minimum time interval for the mobile communication device to scan broadcasting by the LED is 1000ms, RSSI samplings per second may reach up to 30 times. Thus, 15 RSSI may be obtained within 0.5 seconds. As a matter of fact, low noise of RSSI may be obtained by average, and latitude, longitude and heights of the mobile communication device may be obtained through a location algorithm.

Next, the Bluetooth low power module of the LED light source is operated in a master node module 202 or the lamp control mode, and scans a slave node surrounding the mobile communication device, such as a bracelet, in every 0.5 seconds. The bracelet is operated in the slave node mode and may be directly read by the master node of the LED light source, and determines brightness of dimming based on a strongest RSSI value of a bracelet proximate to the LED light source. High frequencies of automatic dimming is not required, as adjustments may be acceptable once for a few seconds. This is mainly to prevent people from leaving lights on, or avoid excessive low illumination or excessive high illumination. As far as dimming changes is concerned, adjustments are not performed constantly. RSSI may be divided into sections, such as four sections. If RSSI does not hop, then adjustments for brightness of lamps are not required.

FIG. 12 indicates that the LED light source is operated in positioning/lamp control mode, and a ratio for time sharing is not fixed, as the time sharing may be adjusted based on needs. For example, the positioning mode may be operated continually for 0.5-1.5 seconds, while the lamp control (dimming) mode for 0.5 seconds. Accordingly, positioning for a cellular phone may be completed continually and effectively, while requirements for dimming may be met without delay.

It is worth to note that if the LED light source reads RSSI messages transmitted from the Bluetooth slave node of a proximate bracelet, dimming may be performed only based on RSSI. However, if no RSSI message could be read from any Bluetooth slave node, two situations may possible happen. One situation may be that user with bracelet leaves already, and the other situation may be that the bracelet is operated in the master node mode, such that RSSI messages could not be read. Therefore, based on the above, in principle, cycles for master-slave switches of the bracelet should be different from cycles for master-slave switches of the LED light sources. Further more, in order to avoid lights for being turned off when RSSI could not be read, one more cycle may be given to see if RSSI could be read before turning off the lights. The reason for doing so is to significantly reduce possibilities of turning off the lights in mistakes.

Figure 13:
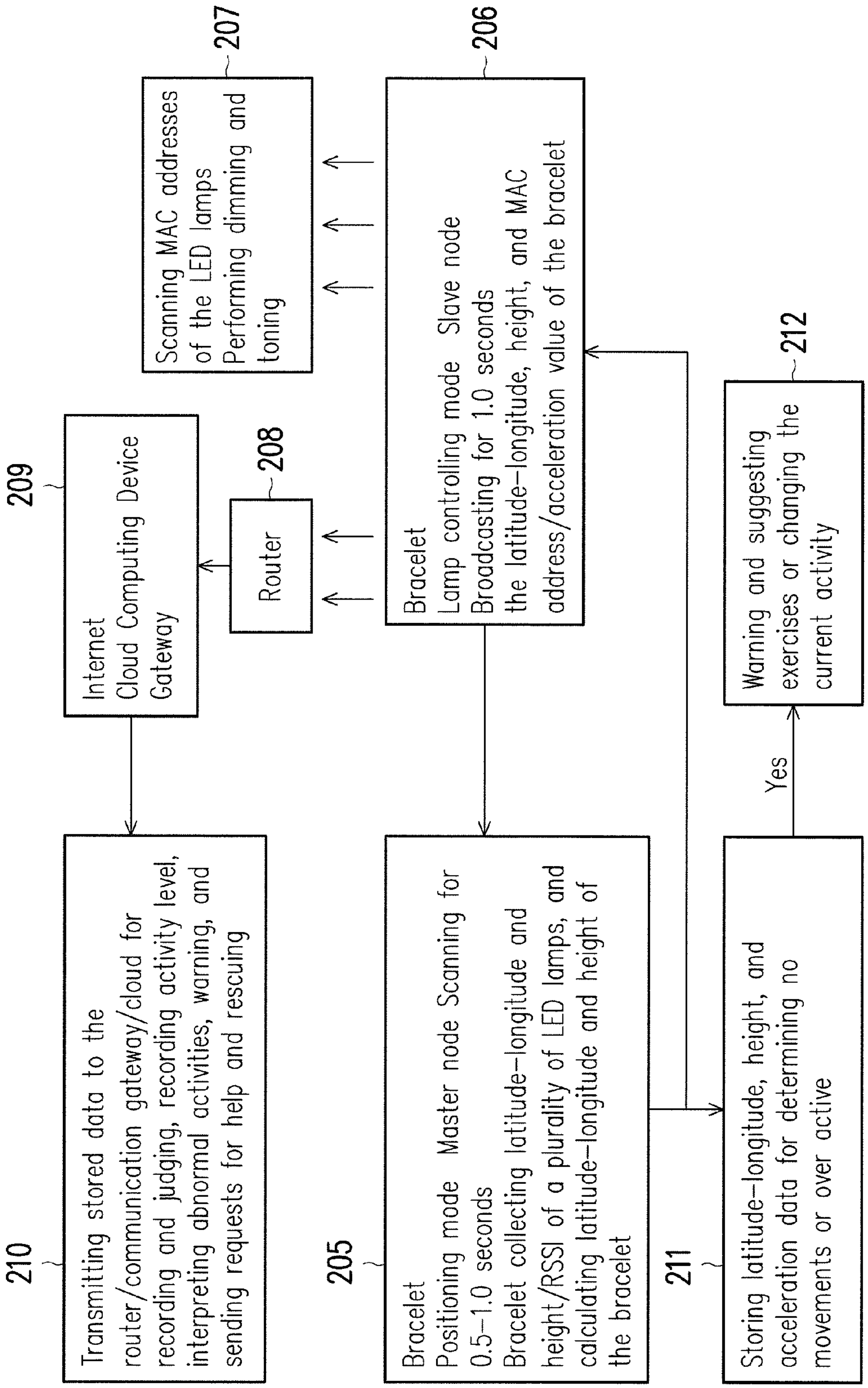
FIG. 13 illustrates the bracelet operated in positioning/dimming modes.

With reference to the illustration in FIG. 13, the bracelet is operated in positioning/lamp control (dimming) modes. According to the concept of time sharing, the positioning mode is updated in every 0.5-1.0 seconds and the lamp control mode is updated in every 1.0 seconds. The Bluetooth low power module of the bracelet is operated in a master node module 205, and scans a slave node of the LED lamp surrounding the mobile communication device in every 0.5 seconds, obtains RSSI of the proximate LED light sources, and latitudes and longitudes and heights thereof so as to calculate latitudes and longitudes and heights of the bracelet. Further, in step 211, data of latitudes and longitudes and heights as well as data of acceleration may be continuously stored so as to determine if a user is not moving nor active for longer than a period of time. If it is determined that a user is neither moving nor active for longer than the period of time, a warning will be sent to suggest exercises or to change the activity, as in step 212.

Next, in Step 206, the bracelet is operated in a passive lamp control (dimming) mode and broadcasts latitudes and longitudes and heights, MAC address and acceleration values of the bracelet. In Step 207, if the LED light source is in master node mode, dimming will be performed based on scanned RSSI values of the bracelet. A router 208, for example, is BT4.0/WIFI or BT4.0/PLC or BT4.0/Ethernet, and BT4.0 thereof is deemed as the master node for long. When information such as latitudes and longitudes and heights, MAC address, acceleration values of the bracelet are scanned, the information may be stored in the communication (channel) gateway or cloud 209 for records and judgments. Warnings will be issued when activities are determined as abnormal so as to send out information asking for help and rescue. Remote inquires and monitoring may also be further provided, as shown in block 210.

Embodiment 2: A Bracelet for Remotely Turning Lights on and Off

Figure 14:
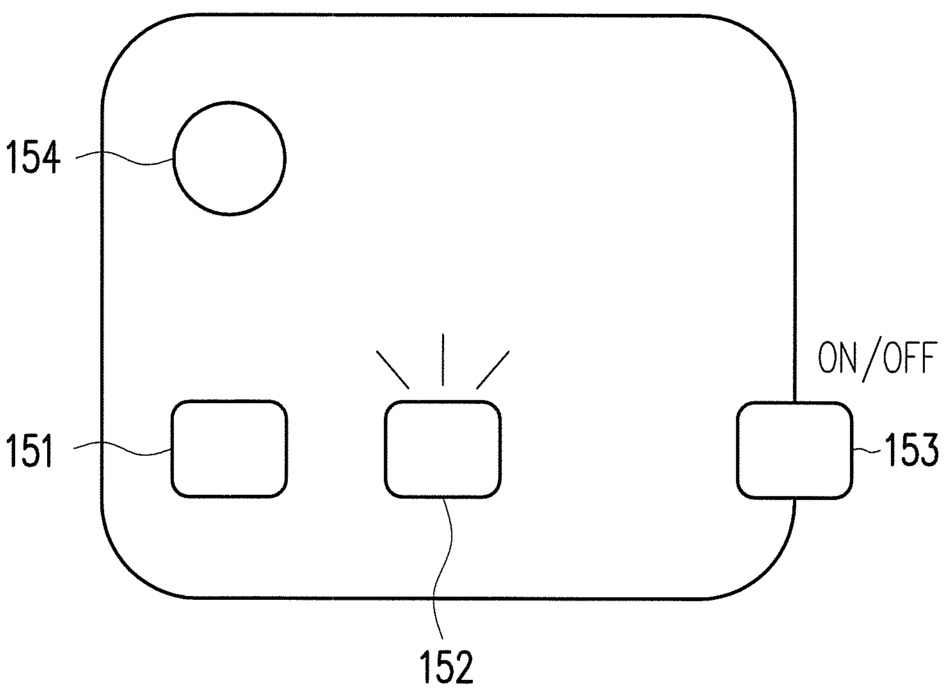
FIG. 14 is a structural drawing illustrating bracelet buttons of the invention for having functions for remotely switching the LED lamp.

FIG. 14 illustrates one embodiment of the bracelet. A sliding shaft 153 having two sections of switches is ON. The primary purpose thereof is to start movements and recording after activating power source of the bracelet or being connected to a cellular phone. If the red LED lamp 154 flashes slowly, it indicates that charging is needed because power of the bracelet is dying. When the sliding shaft 153 having two sections of switches is OFF, power will be shut down. A red button 151 is deemed as an emergency button. If seniors or children at home, patients in emergency rooms of hospitals, or inpatients have emergency issues or are in need of getting help, they may press this button asking for help by sending requests through proximate a BT4.0/WIFI router, a BT4.0/PLC router or BT4.0/GATEWAY to Clouds. At this time, an LED lamp 154 flashes quickly. If the Cloud receives the requests, it sends rescuers and transmits a signal showing the receipt of the emergency request to the bracelet as a response. At this time, the LED lamp 154 would go out. Then what a help seeker needs to do is to wait patiently the arrival of the rescuers.

A default mode for the bracelet is set as an automatic positioning control lamp, but may be switched to a remote control mode with a purpose of making up insufficient positioning control lamp. Examples are as follows:

1. Lights are turned off or dimmed during sleep, and are turned on or lightened up when waking up in the middle of nights for toilets, drinking or taking medications. A remote control mode installed in the mobile communication device as a remote controller may directly be used for the time being to turn on or turn up lights before getting up. In this way, vision is clear, and nearsighted people could also find their eyeglasses. When they are back to beds after using the toilets, they may remotely control the lights for being dimmed or turned off. This is a relatively safer procedure for them, especially for seniors who need to wear more clothes in winters and see their surroundings clearly before getting out of beds, so that they would not fall. The remote control mode is necessary because sometimes bed lamps are not installed by bedsides.

2. When people watch TV during midnights and do not want to turn on main lights or turn up lights, they may remotely control lights by their own.

3. When illumination provided by the positioning control lamp cannot meet special needs.

Figure 15:
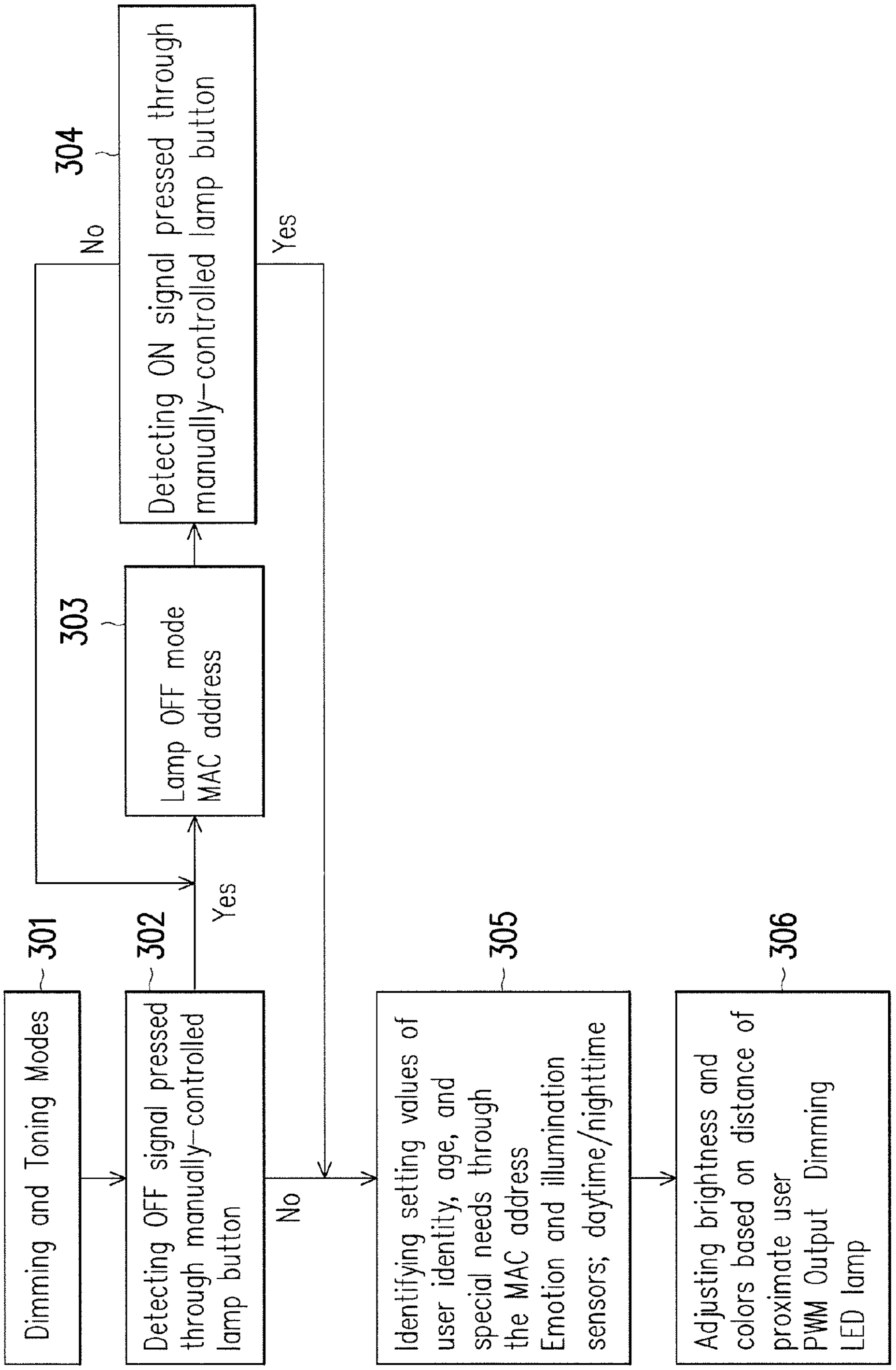
FIG. 15 is a flowchart illustrating the bracelet of the invention for remotely switching the LED lamp.

A yellow button 152 is deemed as a manual remote control button and a primary function thereof is to turn off nearest LED lights in a manual mode through the mobile communication device. Please refer to FIG. 15 for related procedures. When the LED lights are in dimming and toning mode in Step 301, a signal for turning off lights pressed through a manually-controlled lamp button is checked for its validity in Step 302. If the signal is verified, the lights are turned off in Step 303. A MAC address of the Bluetooth module of the bracelet is stored in the LED lamp until the manually-controlled lamp button is pressed again. If the button is pressed again, then a new MAC address of the bracelet is checked to see if it matches the MAC address previously stored in Step 304. If it matches, then setting values for special needs such as identities and ages are identified through the MAC address. (In other words, a subscriber identification stored in the mobile communication device held by a user may control illumination of the lamps individually or in groups.) In addition, brightness and colors may be adjusted based on a distance between the lights and a nearest user by referring to user emotions, measured values of the illumination sensors and daytime/night time, and the above information may be outputted to the LED lights (chips) in pulse-width modulation (PWM) in Step 306. Namely, an emotion sensor may further be installed for the sake of the user. The emotion sensor may be selected from a surface thermometer, a surface galvanometer, heartbeats, a surface rheometer and respiratory rates. The measured values by the emotion sensor are transmitted to the mobile communication device held by the user, and an application program controls illumination of the lamps after determining emotions based on the measured values of the emotion sensor.

The manually-controlled lamp button, in general, refers to the multifunctional bracelet appeared in the proximity of the LED lamps and includes a mobile device with a built-in lamp controlling APP or a signal transmitted from a central lamp controlling system (communication gateway).

In terms of interactions between the mobile communication device and the LED lamps as well as other related applications, the establishment of standard regulations for communication protocols is required, such that the microcontroller in the LED lamps is regulated. As shown in Table 1 below, a smart illumination control may be achieved as long as communication protocols broadcasted from or written by the Bluetooth low power module adopted by varieties of mobile devices conforming to the standard communication protocols.

TABLE 1

Contents and Formats of Data Broadcasting

| Function Type | Code (Data Length) | Applicable Scope |
|---|---|---|
| MAC Address | 48-bit | Bracelet, cellular phone, flat |
| Longitude | 24-bit | Bracelet, cellular phone, flat |
| Latitude | 24-bit | Bracelet, cellular phone, flat |
| Height | 10-bit | Bracelet, cellular phone, flat |
| Emergency Button | 1-Bit, 0—no emergency, 1—emergency | Bracelet, cellular phone, flat |
| Manually-controlled Lamp Button | 1-Bit, 0—not functioning, 1—functioning | Bracelet, cellular phone, flat |
| Dimming or Toning | 1-Bit, 0—dimming, 1—toning (Bracelet only processes toning) | Smart phone, flat, central control |
| Toning Data | 24-bit, R, G, B (Only values of R are taken into | Smart phone, flat, central control |

TABLE 1-continued

| Contents and Formats of Data Broadcasting | | |
|---|---|---|
| Function Type | Code (Data Length) | Applicable Scope |
| | account if toning is processed alone) 16-bit, cool white or warm white | |
| Accelerometer | 24-bit, x axis, y axis, z axis | Bracelet, cellular phone, flat |
| Daylight Sensor | 8-bit | Central control |
| Emotion sensor | 8-bit, | Emotion bracelet, cellular phone, flat |
| Gas Sensor | 8-bit | Central control, environment sensing |
| Compensated lighting based on ages and special requirements | Illumination is provided based on protocols at 8-bit, 128; compensate illumination when lower than 128 and reducing illumination when higher than 128 | |

Embodiment 4: Bracelet Capable of Dimming by Remote Control

Regardless of day time or night time, if the most appropriate illumination is required, a preferable way is to use the illumination sensor to provide illuminance corresponding to the current environment and compensate to provide enough illumination. The illumination sensor may be electrically connected to a Bluetooth control panel, but a position thereof where the illumination sensor senses is based on the capability of detecting ambient illumination. The illumination sensor may be arranged in the bracelet for directly detecting whether sufficient illumination around a wearer is provided. If the illumination sensor is not required, a way to tell whether illumination is sufficient or not is to adopt daytime lighting and nighttime lighting, which primarily distinguish daytime from nighttime through sunrise or sunset time.

Figure 16:
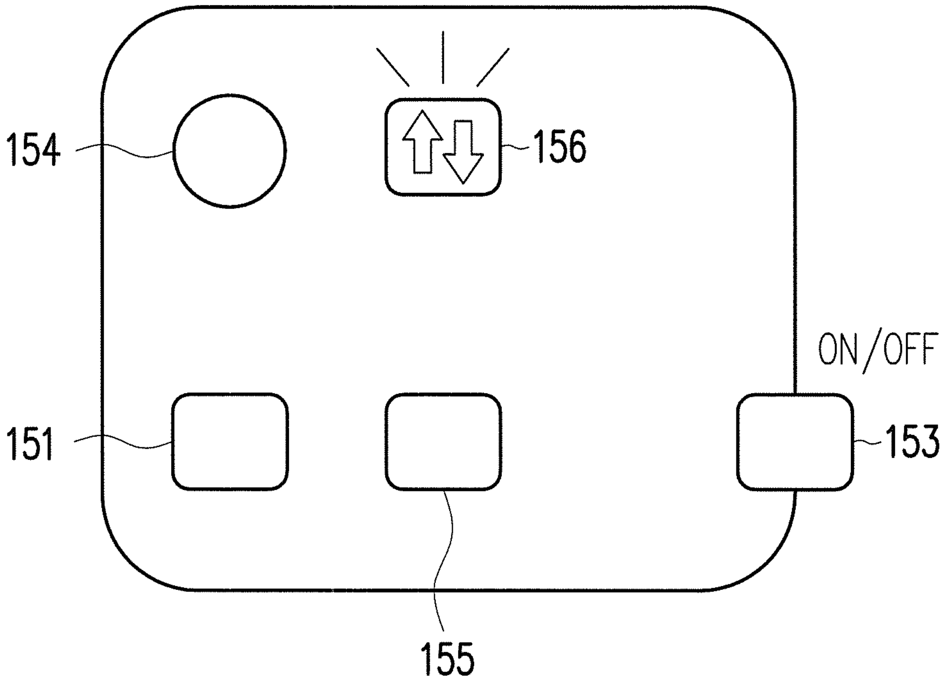
FIG. 16 is a structural drawing illustration bracelet buttons of the invention for having functions for remotely dimming the LED lamp.
Figure 17:
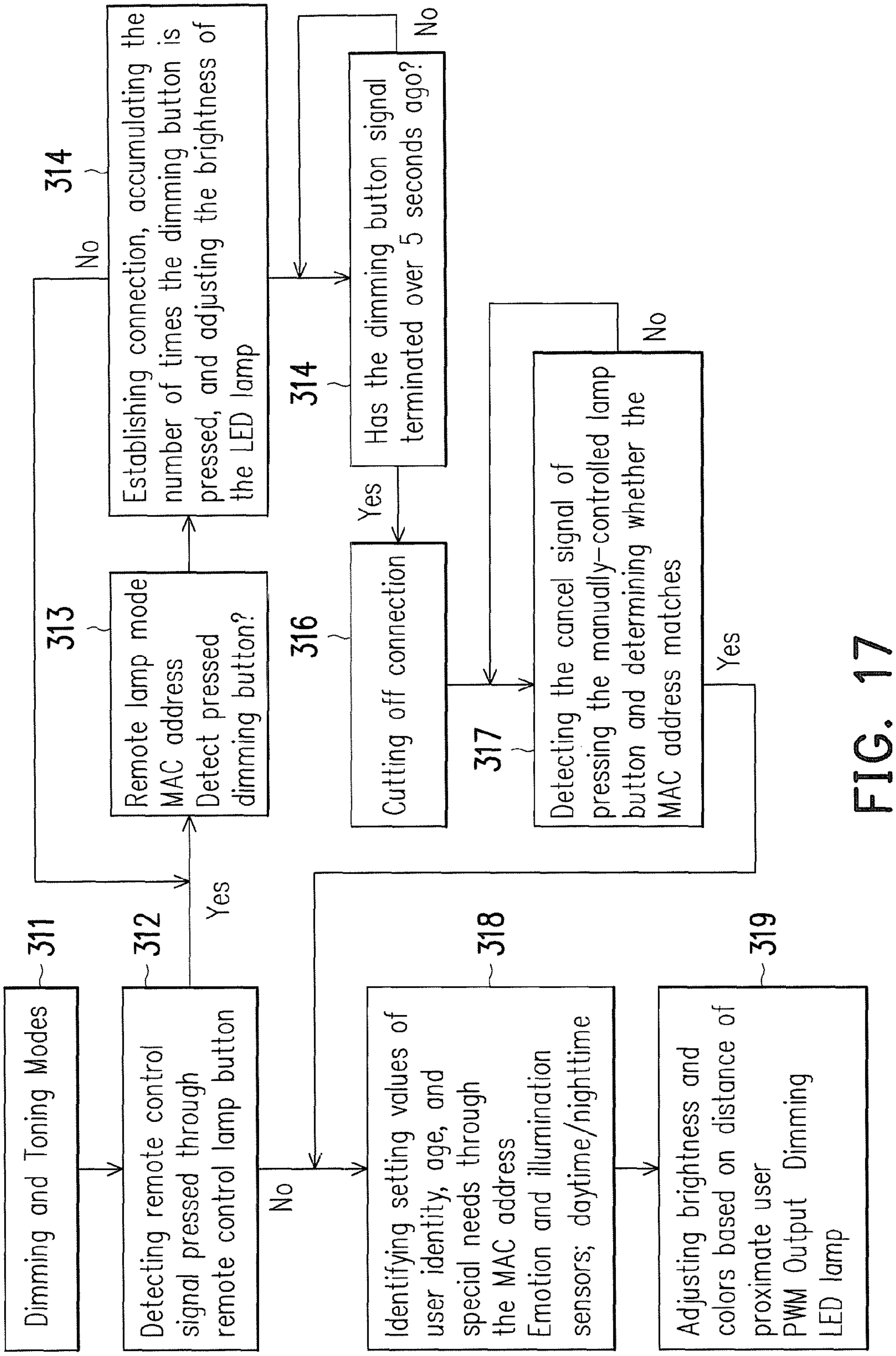
FIG. 17 is a flowchart illustrating the bracelet of the invention for remotely dimming the LED lamp.

Functions of manually-control buttons are the same as those of a remote control. As shown in FIG. 16, a primary function of the sliding shaft 153 having two sections of switches for being ON is to perform operations and recordings after the electric power of the bracelet is turned on or after the bracelet is connected on line with a cellular phone. If the red LED lamp 154 flashes slowly, it indicates that charging is needed because power of the bracelet is dying. The electric power is turned off when the sliding shaft 153 having two sections of switches is OFF. When the bracelet is deemed as a remote controller, an operation mode thereof is on the master node, while the LED lamp is on the slave node, such that online connection may be established for the bracelet and the dimming function may be written in. A button 155 is configured for activating a remote mode, while a button 156 is configured for adjusting brightness. A flowchart of an overall dimming and toning modes is as shown in FIG. 17. When the LED lamps are in dimming and toning modes in Step 311, the LED microcontroller detects if a remote signal in Step 312 is received. If the remote signal in Step 312 is not received, the LED lamps are operated in positioning control lamp mode in Step 318 to set up values based on special requirements such as identifications and ages through the MAC address and by referring to measured values of the emotion sensor and the illumination sensors as well as daytime/nighttime, and brightness and colors are adjusted based on distances between the lamp and the most proximate user and are outputted to the LED lights (chips) in pulse-width modulation (PWM) in Step 319.

If the LED microcontroller confirms receipt of the remote signal, the remote mode in Step 313 is operated to detect if a dimming button is pressed. If the dimming button is pressed, online connection in Step 314 is established, numbers of pressing the dimming button are accumulated to adjust brightness of the LED lamps. Brightness level is added up every time the dimming button is pressed until the level reaches its highest level. If the button is pressed again, the brightness level is gradually reduced until it reaches a lowest level to minimal brightness. If an ending time for a signal of the dimming button is over 5 seconds in Step 315, online connection is cut off in Step 316. The LED microcontroller begin to detect a cancellation signal pressed through a remotely-controlled lamp button and determines a match of the MAC address in Step 317 before recovery of operating in the positioning control lamp mode. A purpose for determining the match of the MAC address is to determine whether the cancellation signal pressed through the remotely-controlled lamp button is broadcasted by a remote communication device held by others, which would have different MAC address.

Although the invention has been disclosed with reference to the aforesaid embodiments, they are not intended to limit the invention. It will be apparent to those skilled in the art that various modifications and variations can be made to the structure of the disclosed embodiments without departing from the scope or spirit of the invention. In view of the foregoing, it is intended that the disclosure cover modifications and variations of the specification provided they fall within the scope of the following claims and their equivalents.

What is claimed is:

1. An illumination control system, comprising:

a plurality of stationary LED-based lamps, wherein each of the LED-based lamps comprises:

a controller for storing a location of each of the lamps, wherein the location includes three-dimensional coordinates or coordinate values of latitude-longitude and height of each of the lamps; and a wireless communication module for communicating wirelessly with a mobile communication device and broadcasting the location of each of the lamps by using at least one of Bluetooth, Wi-Fi, ZigBee and ANT+ technology;

the mobile communication device configured to communicate wirelessly with the wireless communication module of each of the lamps;

a control program configured to be executed within each of the lamps or the mobile communication device and to perform illumination control of each of the lamps based on a distance between the mobile communication and each of the lamps or a coordinate value calculation, wherein when the control program is executed, the mobile communication device communicates with at least one lamp to receive the broadcasted location directly from the at least one lamp, and to calculate a three-dimensional coordinates or values of latitude-longitude and height of the mobile communication device through the three-point positioning algorithms according to the received location of the at least one lamp, wherein the wireless communication module of each of the LED-based lamps broadcasts the three-dimensional coordinates of each of the LED-based lamps during a positioning mode, and the wireless communication module of each of the LED-based lamps scans the mobile communication device during a lamp control mode, wherein the positioning mode and the lamp control mode are operated alternately.

2. The illumination control system as claimed in claim 1, wherein each of the lamps further comprises:

a microcontroller configured to perform illumination control of a light source of the lamp, the microcontroller storing the three-dimensional coordinates or the values of latitude-longitude and height of the lamp; and a driving power module providing an electric source for the lamp to operate.

3. The illumination control system as claimed in claim 2, wherein the illumination control comprises dimming, color temperature adjustment, and toning adjustment.

4. The illumination control system as claimed in claim 2, wherein the wireless communication module is selected from Bluetooth, ZigBee, Wi-Fi, and ANT+, such that the wireless communication module is configured to transmit data with any mobile communication device having the corresponding wireless communication module.

5. The illumination control system as claimed in claim 2, wherein a sensor module is further installed in each of the lamps for detecting environmental changes and transmitting data indicating the environmental changes to the microcontroller, and the microcontroller performs illumination control of the light source of each of the LED-based lamps according to the data transmitted by the sensor module.

6. The illumination control system as claimed in claim 5, wherein the sensor module is a temperature sensor configured to sense an indoor temperature and transmit a temperature data to the microcontroller to process calculation settings for a desired illumination.

7. The illumination control system as claimed in claim 5, wherein the sensor module is a photosensitive sensor configured to sense a brightness of indoor lights and transmitting the brightness data to the microcontroller to process calculation settings for a desired illumination.

8. The illumination control system as claimed in claim 1, wherein the mobile communication device has a function for connecting to the Internet and remotely controlling illumination of each of the lamps through the Internet.

9. The illumination control system as claimed in claim 1, wherein the mobile communication device is selected from a smart phone, a tablet computer, a bracelet, a watch, a wearable computer, and an electronic accessory on a body.

10. The illumination control system as claimed in claim 9, wherein the mobile communication device held by a user performs illumination control of each of the lamps based on the distance between the mobile communication device and each of the lamps.

11. The illumination control system as claim in claim 1, wherein an emotion sensor is further installed on a user, the emotion sensor being selected from a surface thermometer, a surface galvanometer, a heartbeat monitor, a rheometer, and a respiratory rate monitor, the measurements of the emotion sensor and an application program controls illumination of each of the lamps after determining emotions based on measured values of the emotion sensor transmitted to the mobile communication device held by the user.

12. The illumination control system as claimed in claim 11, wherein the mobile communication device held by a user has a user identification function for controlling illumination individually or in groups based on age, identity, and special needs.

13. The illumination control system as claimed in claim 1, wherein when each of the lamps is a slave node and the mobile communication device held by a user is a master node, the mobile communication device scans and obtains the three-dimensional coordinates of each of the lamps which are broadcasted by each of the lamps, and the user using the mobile communication device for controlling illumination of each of the lamps individually or in groups according to the distance between each of the lamps and the mobile communication device.

14. The illumination control system as claimed in claim 1, wherein when each of the lamps is a master node and the mobile communication device held by a user is a slave node, each of the lamps obtains the RSSI broadcasted by the mobile communication device, calculates a distance between each of the lamps and the mobile device according to the received RSSI, and controls illumination of each of the lamps individually or in groups according to the distance between each of the lamps and the mobile communication device.

15. The illumination control system as claimed in claim 1, wherein each of the lamps is a slave node during the lamp control mode and is a master node during the positioning mode, and a switching cycle between the master node and the slave node of the lamps is different from the switching cycle between a master node and a slave node of the mobile communication device.

16. A method for controlling an illumination system, the illumination system comprising a plurality of stationary LED-based light source, the method comprising:

obtaining an interior blueprint from an interior designer or an architect, or by measuring an interior blueprint;

marking locations of each of the LED light sources in the interior blueprint, a way of marking being completed by obtaining latitude-longitude and height coordinates of outermost four corners of a building through electronic map, and interpolatively calculating coordinates of latitude-longitude and height of each of the LED light sources, the LED light sources comprising lamps including ceiling lamps, wall lamps, recessed lamps, a Bluetooth communication module substantially being installed on a lamp device or lamp socket and also being installed in LED light bulbs or light tubes, the lamp device having a plurality of lamps being able to be installed on the lamp device, a set of lamps being dimmed or toned as a whole, and an LED lamp embedded with a Bluetooth module being directly selected for any LED lamp in need of individual dimming or color adjusting;

setting required luminance values for the locations of each of the LED light sources based on an illumination design of an interior designer, or a need of an individual or family members, or based on an illumination standard for public areas promulgated by a nation; and writing a setting of a Bluetooth module in each of the LED light sources with coordinates of latitude-longitude and height, default luminance values, and ranges of permissible luminance values, the writing of the setting being processed after directly connecting to each of the Bluetooth modules through an application of the mobile communication device, and also being processed after connecting to each of the Bluetooth modules one by one through a communication gateway, wherein each of the LED light sources comprises a wireless communication module for communicating wirelessly with a mobile communication device and broadcasting the location which includes three-dimensional coordinates or coordinate values of latitude-longitude and height of each of the lamps by using at least one of Bluetooth, Wi-Fi, ZigBee and ANT+ technology, when a control program is executed within each of the LED light sources or the mobile communication device, the mobile communication device communicates with at least one lamp to receive the broadcasted location directly from the at least one lamp, and to calculate a three-dimensional coordinates or values of latitude-longitude and height of the mobile communication device through the three-point positioning algorithms according to the received location of the at least one LED light source, wherein the wireless communication module of each of the LED-based lamps broadcasts the three-dimensional coordinates of each of the LED-based lamps during a positioning mode, and the wireless communication module of each of the LED-based lamps scans the mobile communication device during a lamp control mode, wherein the positioning mode and the lamp control mode are operated alternately.

* * * * *